Oct. 20, 1925. Re. 16,190

F. QUINN

AUTOMOBILE LIFT

Original Filed Feb. 6, 1924 2 Sheets-Sheet 1

Inventor
F. Quinn

By Ch. Parker

Attorney

Oct. 20, 1925.

Re. 16,190

F. QUINN

AUTOMOBILE LIFT

Original Filed Feb. 6, 1924 2 Sheets-Sheet 2

Inventor

F. Quinn

By

Ch. Parker

Attorney

Reissued Oct. 20, 1925. Re. 16,190

UNITED STATES PATENT OFFICE.

FRED QUINN, OF OLIVER, ILLINOIS.

AUTOMOBILE LIFT.

Original No. 1,526,232, dated February 10, 1925, Serial No. 691,034, filed February 6, 1924. Application for reissue filed March 20, 1925. Serial No. 17,090.

*To all whom it may concern:*

Be it known that I, FRED QUINN, a citizen of the United States, residing at Oliver, in the county of Edgar and State of Illinois, have invented certain new and useful Improvements in Automobile Lifts, of which the following is a specification.

This invention relates to automobile lifts, and more particularly to a tipping frame adapted to arrange a vehicle at an angle to permit inspection and repair.

An object of the invention is the provision of an apparatus whereby a motor vehicle can be tipped to any desired angle to render the underneath part of the car readily accessible.

A further object is to provide a device that may be employed in connection with vehicles of different lengths or wheel bases.

A further object is the provision of novel means for fastening the vehicle to the lift.

In the accompanying drawings, I have shown one embodiment of the invention. In this showing:

Figure 1:
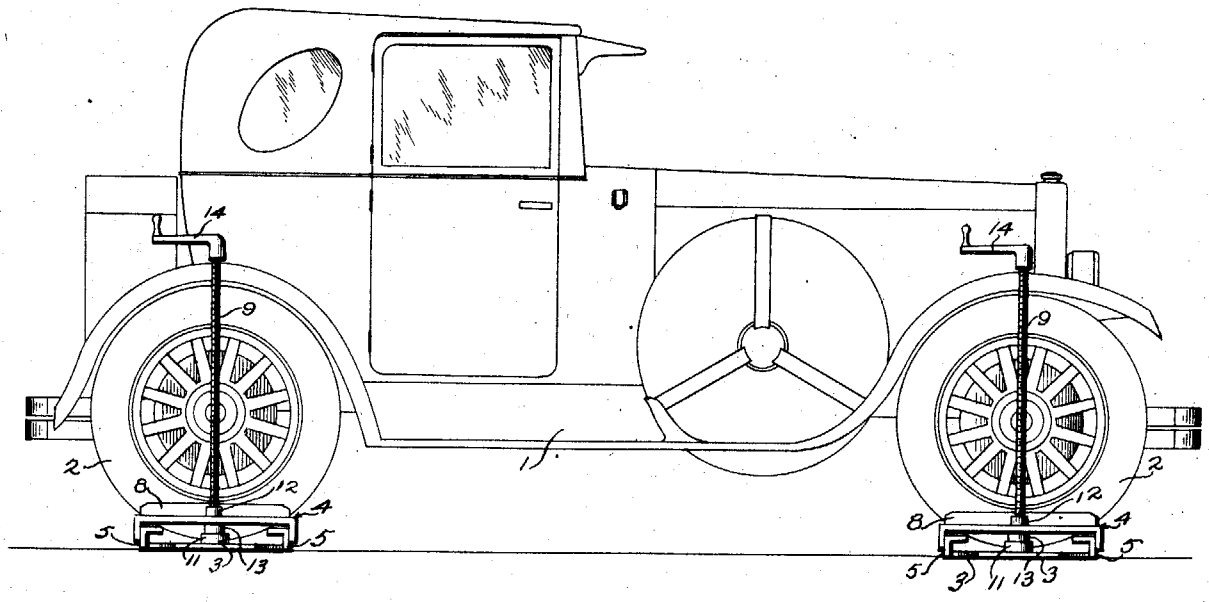
Figure 1 is a side elevation of a motor vehicle showing a pair of lifts in position.
Figure 2:
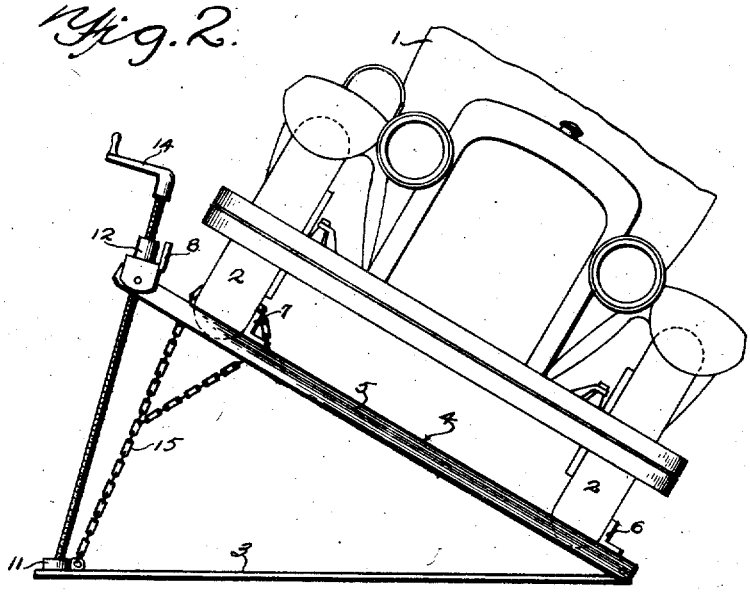
Figure 2 is a front elevation showing the vehicle in raised position.
Figure 3:
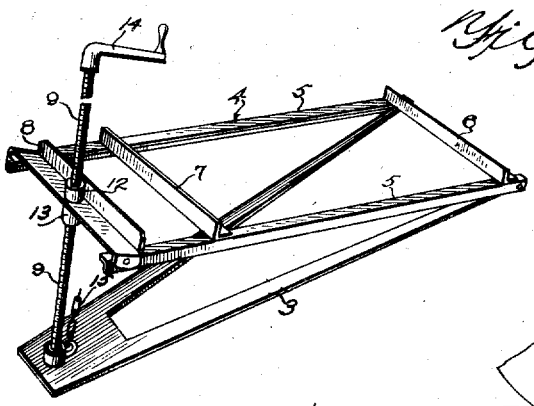
Figure 3 is a perspective view of one of the lifts.

Referring to the drawings, the reference numeral 1 designates a motor vehicle of any desired construction, having the usual wheels 2. The device forming the subject matter of the present invention consists of a base 3, having a lifting member 4 hingedly secured thereto at one edge. As shown, the lifting member consists of a pair of spaced bars 5. Adjacent the hinge, the bars 5 are connected by an angle iron 6 and adjacent the other end of the bars 5, there is provided an inner angle iron 7 and an outer angle iron 8. A threaded shaft 9 is secured to the base. As shown, the threaded shaft is provided with a bolt 10 on its lower end. This bolt is received in a spherical socket formed in a member 11 carried by the base. A threaded shaft extends through a pair of sleeves 12 and 13 secured to the angle iron 8, whereby revolution of the shaft will raise or lower the movable portion of the lift. A suitable handle 14 may be secured to the shaft. As shown in Figure 2 of the drawings, a chain 15 may be secured to a portion of the base and this chain is adapted to be passed around one of the wheels to retain the vehicle on the lift.

Figure 4:
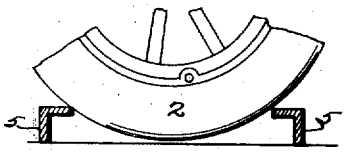
Figure 4 is a vertical sectional view through a portion of the lift showing the position of the wheel of the vehicle, and, Figure 5 is a detail sectional view of a portion of the operation mechanism.
Figure 5:
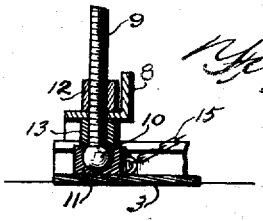

The operation of the device will be apparent from the foregoing description. In raising a vehicle, a pair of lifts is employed, one for the front wheels and one for the back wheels. By employing separate members, they may be adjusted toward each other, depending on the wheel base of the vehicle. The lifts are placed directly in front of the wheels of the vehicle and the vehicle moved forward until the vehicle wheel assumes a position between the two angle irons 5, as shown in Figure 4 of the drawings. The shaft 9 is then rotated to raise the free end of the hinged member of the lift. The angle irons 6 and 7 are engaged by the sides of the wheels and these angle irons prevent the vehicle from sliding off the lift. When the lift is raised nearly to the point desired, the chain 15 is passed around the raised wheel and fastened. The lift is then raised an additional distance to the point desired, tightening the chain.

It is to be understood that the form of my invention herewith shown and described is to be taken as a preferred example of the same, and that various changes in the shape, size, and arrangement of parts may be resorted to without departing from the spirit of the invention or the scope of the subjoined claims.

I claim:

1. In a device of the character described, a stationary base, a member hingedly connected to said base, said member comprising a pair of transverse wheel engaging bars spaced from each other a distance less than the diameter of a motor vehicle wheel, means for elevating the free end of said member, and means for preventing transverse movement of the wheels of a vehicle arranged on said member.

2. In a device of the character described, a stationary base, a member hingedly connected to said base, said member comprising a pair of transverse wheel engaging bars spaced from each other a distance less than the diameter of a motor vehicle wheel, means for preventing transverse movement of a vehicle wheel arranged on said member, a threaded shaft secured to said base, and a sleeve carried by said hinged member adjacent its free end and adapted to receive said shaft.

3. In a device of the character described, a stationary base, a member hingedly connected to said base, said member comprising a pair of transverse wheel engaging bars spaced from each other a distance less than the diameter of a motor vehicle wheel, longitudinally extending members connecting said transverse members adjacent each side of said hinged member and adapted to be disposed beside the wheels of a vehicle arranged on said support to prevent transverse movement of the vehicle, and a threaded shaft carried by said base and engaging said hinged member adjacent its free end to permit elevation of the free end of said hinged member.

4. In a device of the character described, a stationary base, a member hingedly connected to said base, said member comprising a pair of transverse wheel engaging bars spaced from each other a distance less than the diameter of a motor vehicle wheel, means for elevating the free end of said member, means for preventing transverse movement of the wheels of a vehicle arranged on said member, and a chain connected to said base at a point remote from the hinged connection, said chain being adapted to be passed around a portion of the wheel of the vehicle to retain it in position.

5. In a device of the character described, a stationary base, a member hingedly connected to said base, said member comprising a pair of transverse wheel engaging bars spaced from each other a distance less than the diameter of a motor vehicle wheel, and means for elevating the free end of said member.

In testimony whereof, I affix my signature.

FRED QUINN.